United States Patent
Goldensher et al.

(10) Patent No.: US 6,282,540 B1
(45) Date of Patent: Aug. 28, 2001

(54) METHOD AND APPARATUS FOR EFFICIENT PROXIMITY SEARCHING

(75) Inventors: Charles Goldensher, Lebanon; Martin W. Himmelstein, Hanover, both of NH (US)

(73) Assignee: Vicinity Corporation, Sunnyvale, CA (US)

(*) Notice: Subject to any disclaimer, the term of this patent is extended or adjusted under 35 U.S.C. 154(b) by 0 days.

(21) Appl. No.: 09/258,510

(22) Filed: Feb. 26, 1999

(51) Int. Cl.[7] ............................................. G06F 17/30
(52) U.S. Cl. ..................... 707/6; 707/3; 707/2; 707/4; 707/5
(58) Field of Search ................. 707/5, 3, 6, 10, 707/102, 532, 100, 2, 4; 382/218, 306

(56) References Cited

U.S. PATENT DOCUMENTS

| | | | |
|---|---|---|---|
| 4,839,853 | * 6/1989 | Deerwester et al. | 707/5 |
| 5,504,889 | * 4/1996 | Burgess | 707/100 |
| 5,537,491 | * 7/1996 | Mahoney et al. | 382/218 |
| 5,619,709 | * 4/1997 | Caid et al. | 707/532 |
| 5,710,915 | * 1/1998 | McElhiney | 707/3 |
| 5,748,805 | * 5/1998 | Withgott et al. | 382/306 |
| 5,761,652 | * 6/1998 | Wu et al. | 707/2 |
| 5,832,494 | * 11/1998 | Egger et al. | 707/102 |
| 5,864,855 | * 1/1999 | Ruocco et al. | 707/10 |
| 5,913,205 | * 6/1999 | Jain et al. | 707/2 |
| 5,915,250 | * 6/1999 | Jain et al. | 707/100 |
| 5,940,825 | * 8/1999 | Castelli et al. | 707/6 |
| 5,974,412 | * 10/1999 | Hazlehurst et al. | 707/3 |
| 5,983,220 | * 11/1999 | Schmitt | 707/5 |
| 6,021,406 | * 2/2000 | Kuznetsov | 707/6 |
| 6,047,280 | * 4/2000 | Ashby et al. | 707/2 |
| 6,081,803 | * 6/2000 | Ashby et al. | 707/4 |

OTHER PUBLICATIONS

Kao et al., "Efficient Proximity Search in Multivariate Data", 1998, pp. 145–154.*

Takeuchi et al., "A finegrain, current mode scheme for VLSI proximity search engine", IEEE 1998, pp. 184–185.*

* cited by examiner

*Primary Examiner*—Wayne Amsbury
*Assistant Examiner*—Thuy N. Pardo
(74) *Attorney, Agent, or Firm*—Blakely, Sokoloff, Taylor & Zafman, LLP (57) ABSTRACT

A method and apparatus to improve proximity searching. An area containing a population of points is subdivided into a plurality of regions at index time. The population of points and the regions are textual keyed. Attribute(s) are determined corresponding to at least a subset of points from the population. Each attribute or pair of attributes is assigned a bitmap, the bitmap having entries corresponding to the regions in the area. Each entry of the bitmap corresponding to a region having at least one point to which the attribute applies is set. The attribute is then stored in an index with its bitmap. At query time, scanning the bitmap for set bits identifies all potentially relevant regions. These regions may be searched in increasing distance from a spatial origin without incurring the cost of searching fruitless regions.

32 Claims, 4 Drawing Sheets

METHOD AND APPARATUS FOR EFFICIENT PROXIMITY SEARCHING

FIELD OF THE INVENTION

The invention relates to accessing and searching data using spatial content. More specifically, the invention relates to improved efficiency and proximity searching with spatial content based on selection criteria that contain both spatial and non-spatial attributes.

BACKGROUND OF THE INVENTION

Databases that contain geographically-oriented data are becoming increasingly common, in large part fueled by the growth of the Internet and the World Wide Web. Examples include Electronic Yellow Pages (EYP) and classified ad directories that allow users to search for businesses based on some combination of location and non-geographic attributes. In the EYP case, a user might want to locate a specific type of business, or businesses, with specific words in their name, within a given area. An online automobile classified ad system needs to locate cars with specific characteristics within a given distance from a user's home.

As spatial data becomes more common, the requirement that such data be storable and accessible with off-the-shelf hardware and software becomes mandatory. In particular, Relational Database Management systems (RDBMS) are commonly used to store and access large datasets of many varieties, including data with spatial content. RDBMS systems provide security, safety, transactional control, high speed and multi-user access, all of which are important for information systems, including World Wide Web-based information systems. RDBMS systems are also pervasive.

Research has explored access methods that efficiently support the retrieval of spatial data. Such research usually confines itself to exploring data structures and algorithms that efficiently handle the creation and retrieval of data based on spatial attributes, but not spatial attributes in conjunction with non-spatial attributes. Further, most research involves the definition of specialized storage structures and access methods without particular concern over how well the structures and access methods can be overlaid onto those provided by commercial RDBMS systems.

Quadtrees are commonly used to represent spatial data. A quadtree region is represented as a single attribute by interleaving the base-two representations of the X and Y coordinates of a two-dimensional space (more generally an n-dimensional space). Efficient retrieval of spatial data requires the mapping of an n-dimensional space into a single attribute. Without such a mapping, it would be impractical to use modern database systems, including relational database systems, as an access mechanism for large spatial databases. In some circumstances, the performance of database systems can degrade dramatically when concatenated index keys are used. Because a point or a region in space can be represented as a single attribute, quadtrees make effective use of the indexing structures supplied by modern database systems.

In at least one prior art system, when a proximity search is initiated, a search engine determines the set of regions it is prepared to search to locate the entities within the geographic search radius. In addition to proximity, an entity must match other search criteria specified by a user. The search engine examines regions in increasing distance from the search center until enough matching entities are located or all regions in the search radius have been examined. By searching regions in increasing distance from the search center, closer entities will be examined before more distance ones. If the requisite number of entities is found before examining all the regions, some regions will not have to be examined at all if the closest point on the region is further away than the entities that have already been found.

Because the regions are examined solely on the basis of proximity without knowing whether the region contains any relevant entities, the search engine spends considerable time doing unproductive work. In the case of a relational database system, searching a region involves examining an index, and perhaps some associated data buffers to examine attributes in more detail. Index searching is a relatively efficient operation, but the cumulative effect of such searching adds up. For Electronic Yellow Pages, one analysis of query logs consistently show that for keyword queries (e.g., Find businesses in this area with "Central" and "Supplies" in their names), more than 85% of the searched regions do not have any businesses with matching keywords; 58% of the total search time is wasted fruitlessly examining these regions. The numbers are only slightly better for category queries (e.g., Find Restaurants in this area).

What is needed is an improved proximity searching technique that reduces, or even minimizes, the amount of wasted searching.

SUMMARY OF THE INVENTION

A method and apparatus to improve proximity searching is described. In one embodiment, the method comprises receiving a spatial origin and at least one attribute from a user. A bitmap corresponding to the one or more attributes is retrieved. Searching of one or more quads within a distance of the spatial origin is performed, where each quad has at least one point to which the attribute(s) applies as reflected in the bitmap.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

A method and apparatus for improving proximity search capabilities and efficiency is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magneto-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

The programs including executable instructions may be executed by one or more programming devices (e.g., a central processing unit (CPU), processor, controller, etc.) in one or more personal computer systems, servers, workstations, etc.

Overview

A technique is disclosed to enhance proximity searching. The technique provides efficient access to spatial data in combination with non-spatial data that is stored in a database. The database may be any storage structure that allows for searching and retrieval of information, such as, for example, a standard RDBMS.

An area containing a population of points is subdivided into a set of regions. In one embodiment, the criteria for creating regions is based on density, physical size, or other criteria, alone or in combination with each other. A unique key identifies each region. As described below, this unique key may be generated based on its spatial location (e.g., longitude and latitude). Each region contains a number of points. In one embodiment, the number of points is precisely those points within the geographic extent covered by the region. Each point has additional attributes that users of the system may specify as search criteria. For a given attribute, a bitmap is created, the size of which is the same number of bits as there are regions; each bit represents a region. Thus, the bitmap represents the intersection of a geographical region (e.g., a quad) and one or more attributes. Initially, none of the bits in the bitmap are set. If any of the points in a region contain the attribute, the bit that corresponds to the region is set in the bitmap. (The bitmap is generated when the database is first created and maintained as points are added, deleted, or changed.) The bitmaps are stored as single data items in the storage structures.

To accomplish a proximity search, a search engine 1) retrieves the bitmap(s) for the attribute(s) specified by the user, and 2) determines the set of regions within the user's specified search radius. Instead of examining each region within the radius, the engine has only to search the regions for which the appropriate bits in the bitmaps are set. In other words, when performing a proximity search using the one or more attributes, only the geographical regions containing the one or more attributes will be searched. Therefore, a more efficient search may be performed.

Bitmaps can be combined with Boolean operators (e.g., AND, OR, NOT) to further restrict the set of regions to search.

Bitmaps for single attributes are sometimes not selective enough to substantially reduce the search engine's work. For example, assume that the search engine is used to implement an Electronic Yellow Pages (EYP) application. In an EYP application, points represent businesses, and the attributes are the individual words, or tokens, of business names. The attributes "dentist" and "doctor" are among the most common, yet they rarely occur together in the same business name. The bitmaps for both attributes would indicate that most regions include businesses with either token in their name. However, no combination of boolean operations (e.g., AND, OR, NOT) can determine if any particular business in a given region has both tokens. Most of the regions the search engine examines will not contain an appropriately named business.

Attribute pairs solve the problem of inadequate selectivity. The businesses with specific pairs of attributes are far fewer than the businesses with a single attribute. Further, some attributes that are common separately are rarely shared by the same business. Accordingly, by creating bitmaps for each unique pair of attributes and applying boolean logic to the bitmaps at search time, the search engine can reduce the set of fruitlessly searched regions almost to zero. Thus, in the case of a bitmap being generated for two or more non-spatial attributes, a bitmap is created that allows for very efficient data retrieval when accessing spatial data in combination with the two or more attributes.

An added benefit of maintaining bit maps of attribute pairs is that most attribute pairs are uncommon and the bitmaps for most attribute pairs will have very few bits that are set. Hence, most bitmaps will be highly compressible and the storage and retrieval overhead associated with bitmaps can be reduced, or even minimized. Thus, in one embodiment, due to their high compressibility, the bitmaps are compressed prior to their storage in the storage structure.

Figure 1:
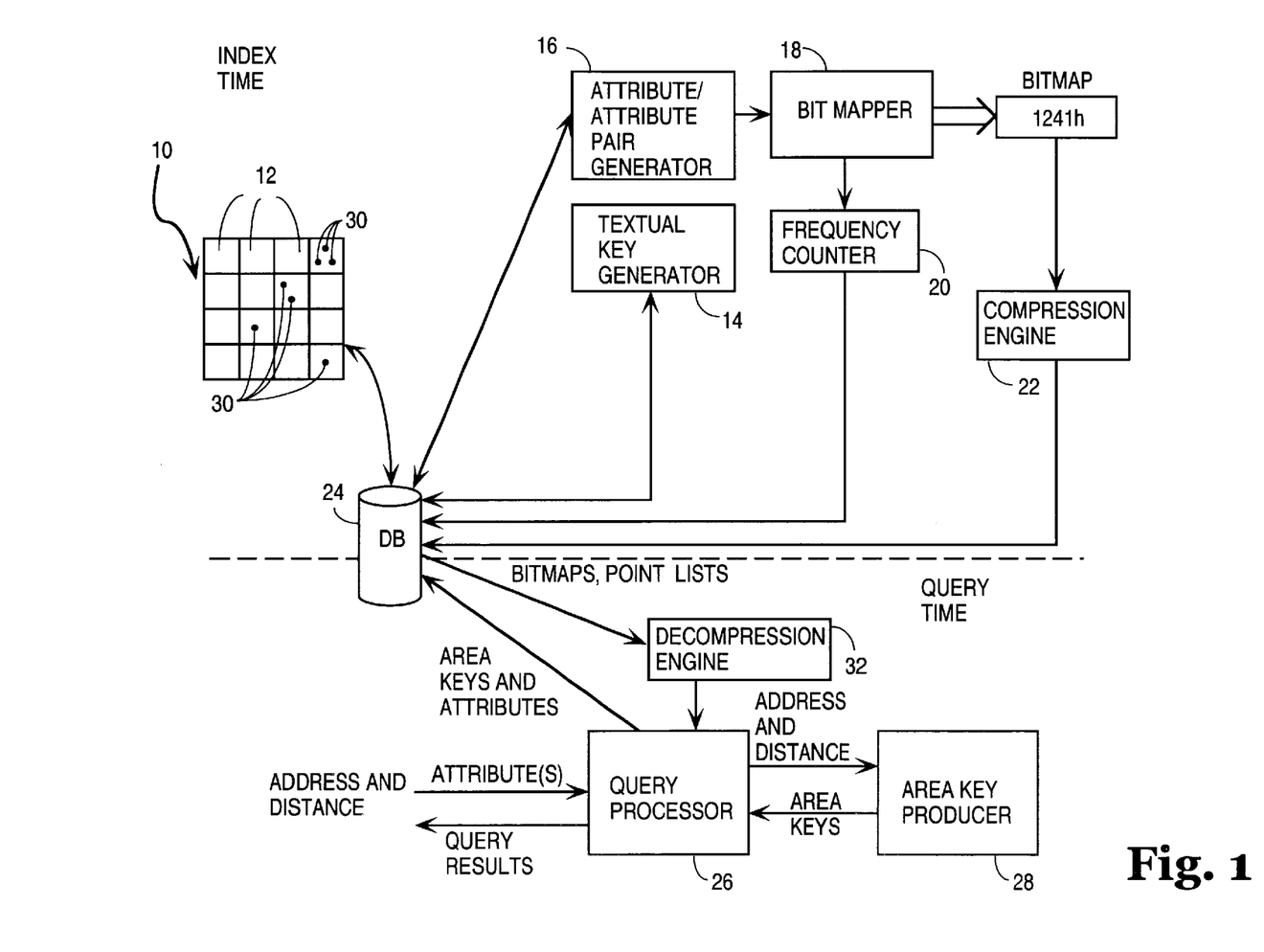
FIG. 1 is a block diagram of a system that allows setting up and searching of information and resources, such as databases.

FIG. 1 is a block diagram of a system that allows setting up and searching of information resources, such as databases. Logically, the operation of the system can be divided into two time periods: index time and query time. During index time, a geographic area 10 is divided into a plurality of regions 12, which are alternatively referred to herein as quads. Within the area 10, a relevant population of points are identified. In one embodiment, the area 10 may correspond to the entire world and the relevant points correspond to businesses (or other category of entity) within that area. It should be understood that the points could be any geographical locations and the area may be a region of any size, such as, for example, a country or smaller geographic locale without departing from the scope of the invention.

A key generator 14 generates a key for each of the regions 12 and also for each point in the relevant population of points. The keys may be textual keys, alphanumeric, ASCHII, binary, etc. The keys may be quadkeys and point keys. Quadtrees are generally well understood in the art. One of ordinary skill in the art will recognize that a point key is a quadkey of arbitrarily fine resolution (e.g., 7 feet between points represented by the point keys). In one embodiment, the key generator 14 defines an integer Q_id which efficiently denotes the base four string by which the quad key is typically represented. This Q_id reduces the storage space for indexing and also facilitates the bitmapping described below. This definition can be performed by a simple mapping table within the key generator 14. (Note that it is not a requirement that the Q_id be structurally related to the quad key in any way, although it could be made to be.)

Certain attributes, or features, apply to a subset of points from the population of points. As used herein, "subset" refers to more than the empty set up to the entire population. An attribute or attribute pair corresponding to a subset of points 30 from the relevant population is generated by attribute/attribute pair generator 16. Attribute/attribute pair generator 16 operates as an attribute identifier. Bitmapper 18 then creates a bitmap associated with the attribute or attribute pair. Bitmapper 18 creates such a bitmap for each entry corresponding to each region 12 of area 10. In the example shown, the bitmap for an attribute applicable to subset 30 would be 1241h, assuming left to right, top to bottom traversal of the grid (0001 for the top row, 0010 for the second row, 0100 for the third row, and 0001 for the fourth row). The bitmap may be compressed by a compression engine 22 before being stored as part of the index for the database 24. Frequency counter 20 may be used to maintain and associate a frequency count with an attribute or attribute pair. For example, an attribute applicable to subset 30 would have a frequency count of seven, one for each of the points in subset 30. This frequency count may also be stored in the database index with its associated attribute or attribute pair. The frequency count can be used to determine which set of attribute pair bitmaps to examine if a user enters a large set of attributes. Often, the filtering efficiency of the one or two least common attribute pairs reduces the need to examine each combination of attribute pairs.

During query time, a query processor 26 receives a spatial origin, an attribute or attributes and optionally a distance and/or a maximum number of points to be returned. The spatial origin may be in the form of an address or any other suitable identification or information indicative of a spatial origin, such as, for example, a longitude and latitude or a point key.

The following is one embodiment of a proximity searching technique that may be performed during query processing.

First, a bounding box is calculated, based on the search center (spatial origin) and the search radius (distance).

Second, a list of quads that intersect the bounding box is generated. The quads may be regions of various sizes computed at load time. The list of quads is sorted in order of distance from the search center.

After sorting, each of the quads in the generated list is searched for points that meet the desired criteria. Any points that meet that criteria are merged into a sorted list of such points.

After searching each quad, a calculation is performed to determine the number of points in the list that are closer to the search center than the nearest point in the next quad to search. If this number is greater than the number of points desired, then the search is complete. (Ensuring that it is greater enables a determination to be made as to whether there were more such points beyond those being returned.) If this number is less than the number of points desired, the search continues with the next quad (if any).

As stated above, this results in a large number of fruitless searches (i.e., searching of a quad which turned up no points meeting the criteria). The present invention addresses this inefficiency.

To avoid performing a large number of fruitless searches, two possible approaches may be taken. In one embodiment, the above query processing may be performed with one modification. After the list of intersecting quads is generated, the list is pruned using the criteria and the bitmap. Thus, the bitmap(s) are used to cull the list of generated quads. In this embodiment, query processor 26 feeds the spatial origin and distance which it receives into an area key (quad) producer 28 which generates a set of area keys (quads) corresponding to the spatial origin and distance. That is, area key producer 28, with the area keys it generates, effectively puts a bounding box around the quads within the distance of the spatial origin. Then query processor 26 accesses the database 24 to acquire all bitmaps associated with the attribute(s). If a given bitmap has been compressed by a compression engine 22, a decompression engine 32 may be required to decompress that bitmap. These bitmaps are then combined into one bitmap, as descried below. The resulting bitmap is then used to cull, from the quad list, those quads which have no points with the required attributes. Note that in one embodiment, query processor 26 performs or controls the operation of all query processing steps.

In another embodiment, query processor 26 generates the list of quads by using the criteria and the bitmap and sorts the list by distance thereafter. Thus, the bitmaps(s) are used to generate the list of generated quads. The resulting bitmap is then used to generate a list of quads. Then query processor 26 sorts the quad list described as in the previous embodiment.

A hybrid embodiment is also possible, where query processor 26 examines the criteria and the bitmap to determine which of the above approaches to take. For example, in one embodiment, query processor 26 may take the first approach if the number of candidate quads and points is large; otherwise query processor 26 takes the second approach. Thus, in this embodiment, one or the other of these techniques is used, depending on the specific query.

Bitmap Generation

In one embodiment, the generation of the bitmap used for culling or quad list generation is performed by obtaining those bitmaps corresponding to the given attributes, and then performing UNION and/or INTERSECTION operations on those bitmaps. In one embodiment, when set bits correspond to 1's, the UNION operation is an OR operation, and the INTERSECTION operation is an AND operation. When set bits correspond to 0's, the UNION operation is an AND and the INTERSECTION operation is a NOR operation.)

For example, in a YP application, a query might consist of searching for businesses that are either Thai restaurants and/or Vietnamese restaurants. Query processor 26 would obtain the bitmap for Thai restaurants and the bitmap for Vietnamese restaurants (utilizing the decompression engine 32, if appropriate) and combine these two bitmaps with the UNION operation. In this manner, the resulting bitmap would contain all bits that were set in either or both of the contributory bitmaps.

In the same application, a query might be to find the business having the name "INTERNATIONAL PAPER PRODUCTS". Three bitmaps, those associated with each pair of words in the name, could be combined with the INTERSECTION operation. In this manner, the resulting bitmap would contain all bits that were set in all the contributory bitmaps.

It should be noted that although shown in block diagram form, the blocks in FIG. 1 may comprise multiple units or functional components or may be combined with one another to form integrated units.

Figure 2:
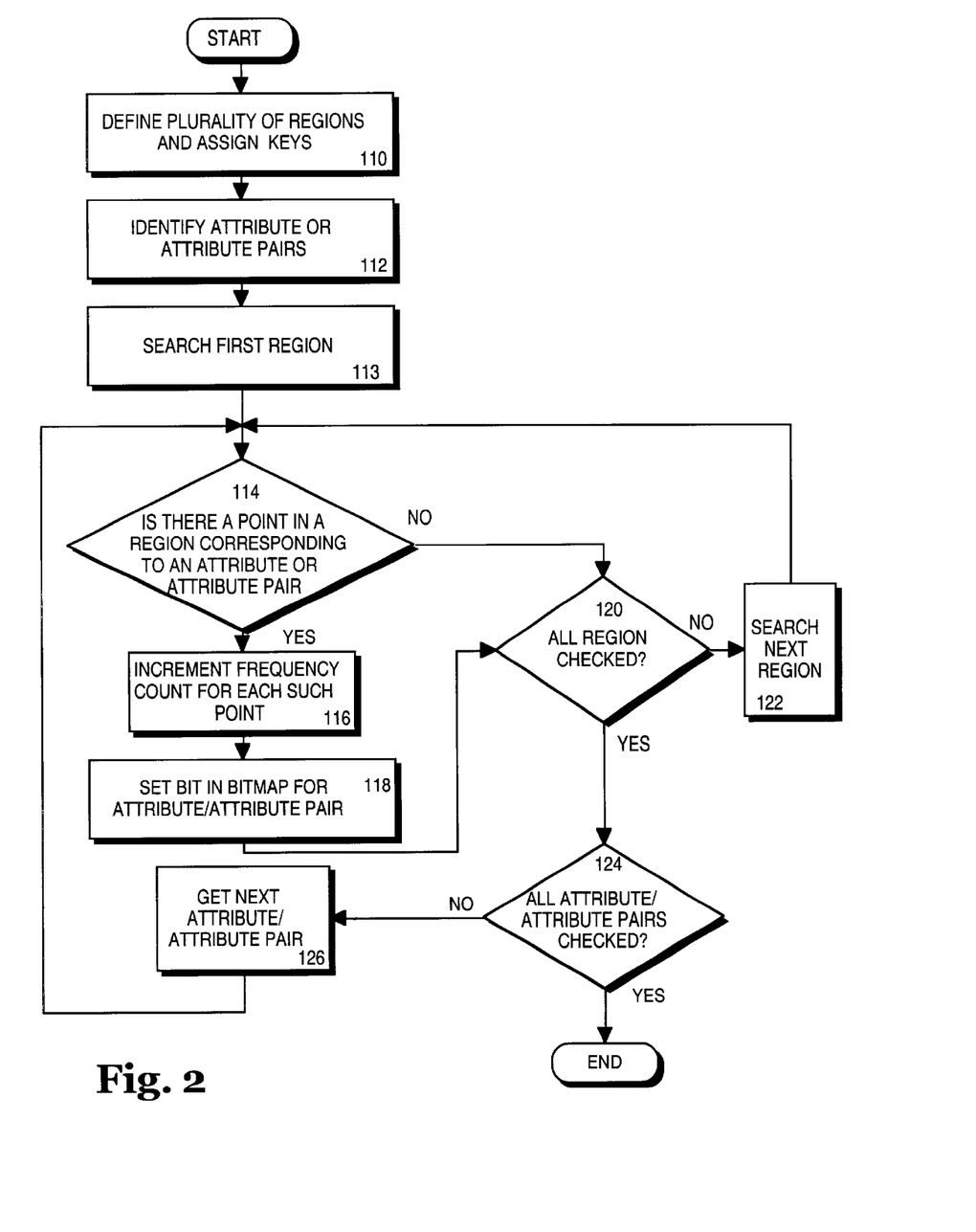
FIG. 2 is a flow chart of one embodiment of a process for bitmap indexing.

FIG. 2 is a flow chart of one embodiment of a process for bitmap indexing. Processing logic performs the process and may be hardware, software, or a combination of both.

Referring to FIG. 2, processing logic defines a plurality of quads and assigned keys (processing block 110). As discussed above, these keys may be textual keys. Processing logic then identifies an attribute or attribute pair (processing block 112). An attribute or attribute pair may be a key word or key word pair or a category, or a category and a key word, for example. When an attribute pair is employed, it is desirable to arrange the attributes comprising the pair in either a lexicographically increasing order or a lexicographically decreasing order to ensure that permutations of the same attributes are not separately bitmapped.

Processing logic then searches a first region to determine if a point exists in a region to which the attribute or attribute pair applies. Processing logic then tests whether there is a point in a region corresponding to an attribute or attribute pair (processing logic 114). If so, then processing logic increments the frequency count for each such point (processing block 116) and sets a bit (or entry) in the bitmap corresponding to the region (processing block 118). As used herein, a bit may be set to "1" or set to "0." Thus, setting a bit does not imply that the bit has any particular value, rather only that all set bits have the same value and all cleared bits have the same value.

After the bitmap bit is set or if processing logic determines there isn't a point in a region corresponding to the attribute or attribute pair, then processing logic tests whether all regions have been checked (processing block 120). If not, processing logic conducts a search of the next region (processing block 122). If all regions have been checked, processing logic tests whether all attributes or attribute pairs have been checked (processing block 124). If they have, indexing has been completed and processing ends. If they have not, processing obtains the next attribute or attribute pair (processing block 126). The system then bitmaps that attribute or attribute pair in the same manner as described above. Note that this need not be done for all possible attributes, but one for those which are being added, modified or deleted.

Figure 3:
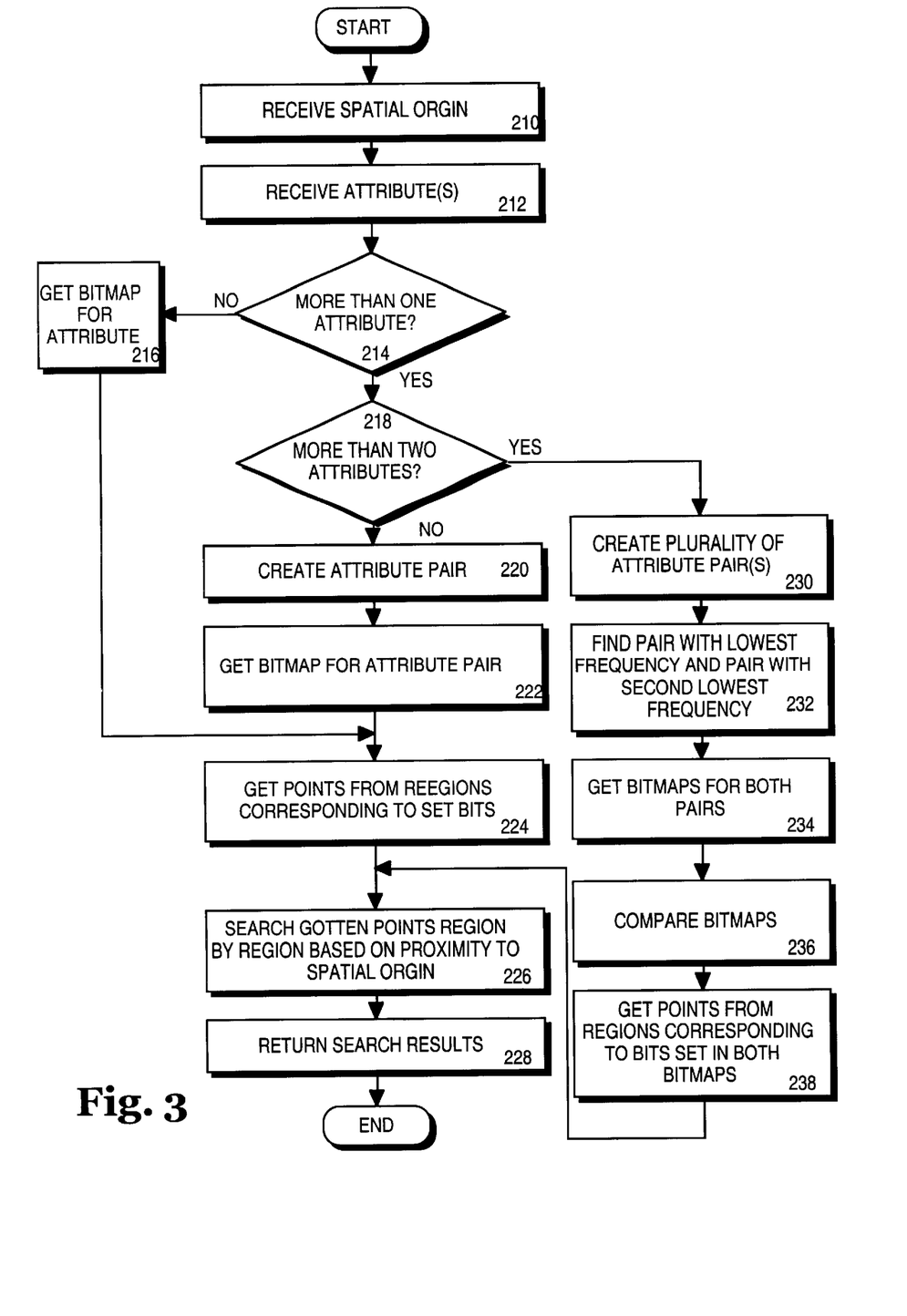
FIG. 3 is a flow chart of the query time operation of one embodiment of a system.

FIG. 3 is a flow chart of one embodiment of the query time operation of a system. Query processor 26 performs these operations using processing logic, which may comprise hardware, software, or a combination of both.

First, processing logic receives a spatial origin (processing block 210) and one or more attributes (processing block 212). Then processing logic tests whether more than one attribute has been received (processing block 214). If only one attribute has been received, processing logic obtains the bitmap for that attribute (processing block 216). If more than one attribute has been received, processing logic tests whether more than two attributes have been received (processing block 218). If only two attributes have been received, processing logic creates an attribute pair from those two attributes (processing block 220).

Processing logic then acquires a bitmap for the attribute pair (processing block 222). Once the bitmap for the attribute (processing block 216) or the attribute pair (processing block 222) has been acquired, processing logic acquires the points from the regions corresponding to set bits on a region by region basis (processing block 224).

If there are more than two attributes, processing logic creates a plurality of attribute pairs (processing block 230). Each attribute pair follows the same lexicographical valued ordering structure to ensure that permutation duplication does not occur. Then processing logic identifies the attribute pair with the lowest frequency and the attribution pair with the second lowest frequency (processing block 232). Processing logic also acquires the bitmap for both the lowest frequency and second lowest frequency attribute pair from the database index (processing block 234).

Processing logic compares the bitmaps (processing block 236) to determine an intersection between the two. If bits are "set" to 1, this can be performed as a logical AND, and if bits are set to 0, a logical NOR may be used. Then, processing logic in query processor 226 obtains the points from regions corresponding to bits set in both bitmaps (processing block 238). The points from regions corresponding to set bits (processing blocks 224 and 238) are quads which contain at least one relevant point. Processing logic searches the points from these regions on a region by region basis in order of increasing proximity from the spatial origin (processing block 226). Then processing logic returns the results of the search to the user (processing block 228).

It is expected that the described use of bitmaps should significantly improve the query time operation of proximity searching by eliminating fruitless quad searches. Additionally, where attribute pairs are employed, nationwide searching becomes very practical. By way of example, it has been found that in an exemplary database having 890,500 keywords and 1945 regions, each containing approximately 6000 points, the average attribute appears in only about 2% of the regions. Moreover, only about 2.6% of the attributes have a frequency of occurrence greater than 100. Statistically, attribute pairs then should narrow the number of regions searched and the number of points returned to a very manageable number even for wide area searches.

Key Generation

In one embodiment, the key corresponding to the spatial information comprises a quad key. The quad key may be generated from geographic coordinates. In a computer mapping application, coordinates are represented as integers of some resolution. For example, these may be 16-bit unsigned integers. If the integers of coordinates, such as coordinate x and coordinate y, are expressed in binary form, with the bits interleaved (most significant bit (MSB) from x, followed by MSB from y, followed by next-MSB from x, next-MSB from y, etc.), then the relationship between coordinates and quad keys is illuminated and a base-4 quad key emerges.

The MSB from x divides the spatial domain (root quad) in half along the x axis. The MSB from y does the same along the y axis. The four possible combinations map onto the four quadrants mentioned above. The next two interleaved bits from x and y, in identical fashion, subdivide the quad defined by the previous bits, and so on, until the last bits are interleaved, yielding a quad key of maximal precision given the resolution of the source coordinates. This full resolution quad key is also referred to herein as a point key in recognition of the fact that it can be mapped back to the source coordinates with greater precision than a quad key of lesser resolution.

Figure 4:
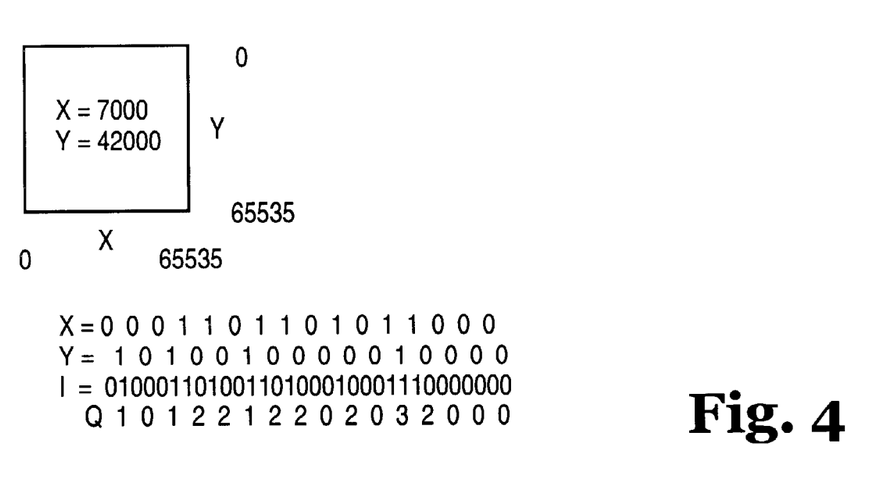
FIG. 4 illustrates one way of deriving a point key.

FIG. 4 shows one technique for deriving a point key. For a particular point, a longitude and latitude exists. By placing the relevant area within a square having x and y coordinates, the longitude and latitude can be converted into coordinates in x and y. In this instance, the x and y coordinates can each be represented by a 16-bit binary value. In this exemplary case, x=7,000 and y=42,000. Taking the binary representation of each coordinate and interleaving those binary values yields a 32-bit binary value, shown as I in FIG. 4. A textual key or quad key, in this case, is Q followed by a conversion of adjacent pairs of bits in the interleaved value to decimal. That is, the pairs of bits grouped from left to right in the interleaved binary values are converted to decimal. Thus, in the exemplary case, the quad key is Q10122122020320000.

Using a language like C which permits bit manipulation, it is an easy and efficient matter to compute a point key. Depending on the implementation, this may be stored as a binary value or in ASCII form. The former is compact, while the latter allows the application to take advantage of efficient structured query language (SQL) searching methods in relational database management systems (RDBMs).

Use of this tiling space method is not restricted to base-2 interleaving. Coordinates represented as base-3 numbers can be used to generate base-9 keys, base-4 to base-16, etc. It should also be noted that other techniques for generating a key or other location indication instead of the point key may be used.

Figure 5:
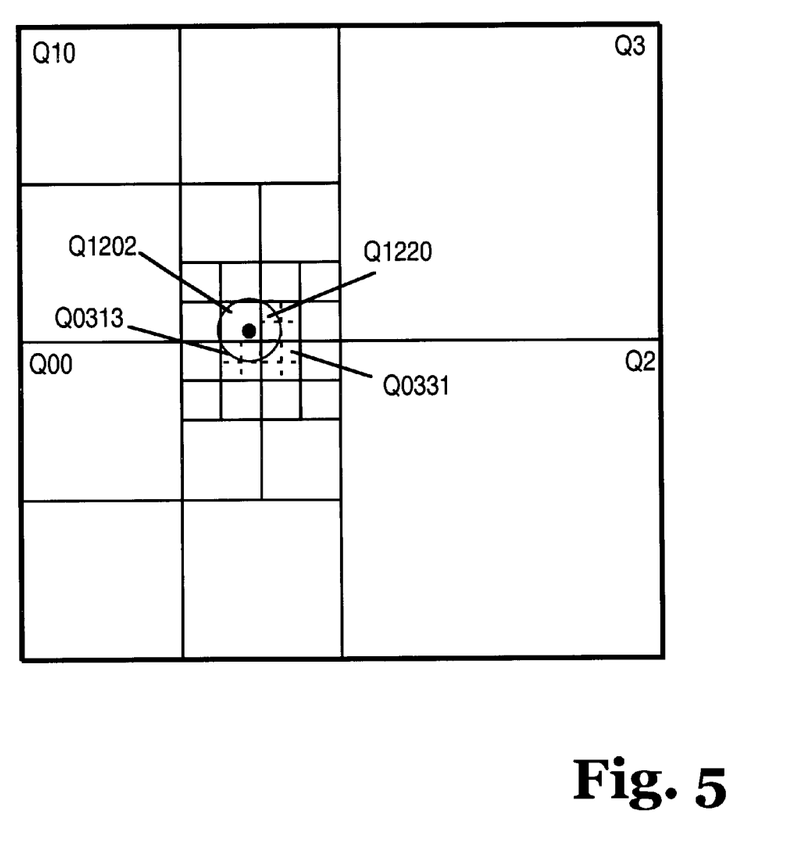
FIG. 5 illustrates exemplary area keys selection.

An area key is any quad key and is shorter than a point key, thereby representing a larger area. During index time, area keys are generated by textual key generator 14. A base-4 point key of 25 characters (including a leading 'Q') will represent an area of about 7–8 feet on a side (at the equator of the earth). Any leading substring of that point key is an area key representing an area in which the point resides. That is, an area key of a given length is simply a leading substring of the point key from which it is derived.

areakey=substr(point key, 1, desiredlength)

It represents an area larger than the point key, but one in which the point key resides. For example, consider the quad key Q101221220203200 to be a point key. For example, the above point resides in Q1012.

In this embodiment, area keys of various lengths are stored for use at search time. Each area key assigned represents a square region of space. The size of the region can be determined by the length of the area key. In essence, given a search center and a radius, a set of area keys representing areas which will tile the circle, will be added to the search criteria to geographically restrict the search.

In this embodiment, area keys (quads) of various lengths are stored for use at search time. At index time, groups of points are given the same area key (quad) such that the sum of points in that quad (with that area key) does not exceed a given threshold. This is done to avoid the excessive overhead of searching quads containing many points.

For example, consider that a threshold of 3 points per quad, along with a list of points having the following full-length quadkeys (sorted by quadkey):

Q101221220201200
Q101221220201301
Q101221220202120
Q101221220202201
Q101221990203200
Q101221220203201
Q101221220203203

These points would end up in the following quads:
Q101221220201 (2 points)
Q101221220202 (2 points)
Q101221220203 (3 points)

In one embodiment, each of the quads (such as above) into which the points fall are assigned a quad id (Qid). This Qid is an integer. It is preferable to assign such integers in an increasing linear sequence, as there is a one-to-one correspondence between the Qids and the bit positions in the bit map. (That is to say, each bit position in the bitmap represents a quad. If that bit is set, there is at least one point in the quad with the associated attribute(s). If the bit is clear, there is no point in that quad with the associated attribute(s).)

Generating Area Keys at Search Time

In one embodiment, the area keys are generated as follows. First, area key generator 28 converts center coordinates and the radius to the same units, if not already expressed as such.

Next, area key generator 28 calculates a bounding box around the circle.

xradius=radius/cos(lat);

yradius=radius;

bounds->botLeft.x=center->x−xradius;

bounds->topRight.x=center->x+xradius;

bounds->botLeft.y=center->y−yradius;

bounds->topRight.y=center->y+yradius;

Area key generator 28 then fetches the list of potential area keys from the database. (The list of potential area keys consists of those that overlap the boundary box.)

Then area key generator 28, in a set of nested loops, traverses the boundary box from the lower left of the bounding box, to the upper right of the bounding box. For each potential area key, area key generator 28 calculates the distance from the center to the area represented by that potential area key (at the point closest to the center). If the distance is less than, or equal to, the desired radius, the area key is added to the list, converting the (x,y) coordinate to an area key.

Note the use of the cos(lat) accounts for the fact that area keys become narrower as they approach the poles.

dy=MIN(MAX(center->y, thisQuad.y), thisQuad.y+ grid.quadSize.y−1)−center->y;

dx=(MIN(MAX(center->x, thisQuad.x), thisQuad.x+ grid.quadSize.x−1)−center->x) * cos(lat);

distance=sqrt((dx*dx)+(dy*dy));

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for proximity searching comprising:
   receiving a spatial origin from a user, the spatial origin identifying a geographic location;
   receiving at least one non-spatial attribute from the user;
   selecting a bitmap corresponding to at least one non-spatial attribute from a plurality of bitmaps, each of the plurality of bitmaps being associated with one or more non-spatial attributes; and
   searching at least one quad, within a distance of the spatial origin, having at least one point to which at least one non-spatial attribute applies as reflected in the bitmap.

2. The method of claim 1 wherein the at least one non-spatial attribute comprises an attribute pair.

3. The method of claim 1 wherein the spatial origin comprises an address.

4. The method of claim 1 further comprising:
   receiving three or more non-spatial attributes from the user;
   determining which sets of attribute pairs to use to retrieve intermediate bitmaps;
   retrieving the intermediate bitmaps;
   combining the intermediate bitmaps into a combined bitmap; and
   searching at least one quad, within a distance from the spatial origin, having at least one point to which the non-spatial attributes apply as reflected in the combined bitmap.

5. The method of claim 1 further comprising:
   returning a distance ordered list of points to which the at least one non-spatial attribute applies.

6. The method of claim 1 wherein the at least one non-spatial attribute comprises at least three attributes and further comprising:
   forming a plurality of key word pairs;
   determining which of the plurality of key word pairs is a lowest frequency key word pair; and
   scanning a bitmap corresponding to the lowest frequency key word pair.

7. An apparatus for proximity searching comprising:
   means for receiving a spatial origin from a user, the spatial origin identifying a geographic location;
   means for receiving at least one non-spatial attribute from the user;
   means for selecting a bitmap corresponding to at least one non-spatial attribute from a plurality of bitmaps, each of the plurality of bitmaps being associated with one or more non-spatial attributes; and
   means for searching at least one quad within a distance of the spatial origin, having at least one point to which at least one non-spatial attribute applies as reflected in the bitmap.

8. The apparatus defined in claim 7 wherein the at least one non-spatial attribute comprises an attribute pair.

9. The apparatus defined in claim 7 wherein the spatial origin comprises an address.

10. The apparatus defined in claim 7 further comprising:
    means for receiving three or more non-spatial attributes from the user;
    means for determining which sets of attribute pairs to use to retrieve intermediate bitmaps;
    means for retrieving the intermediate bitmaps;
    means for combining the intermediate bitmaps into a combined bitmap; and
    means for searching at least one quad, within a distance from the spatial origin, having at least one point to which the non-spatial attributes apply as reflected in the combined bitmap.

11. The apparatus defined in claim 7 further comprising means for returning a distance ordered list of points to which at least one non-spatial attribute applies.

12. The apparatus defined in claim 7 wherein the at least one non-spatial attribute comprises at least three attributes and further comprising:
    means for forming a plurality of key word pairs;
    means for determining which of the plurality key word pairs is a lowest frequency key word pair; and
    means for scanning a bitmap corresponding to the lowest frequency key word pair.

13. A recordable storage medium with executable instructions stored thereon, which, when executed by a processing device, cause the processing device to:
    receive a spatial origin from a user, the spatial origin identifying a geographic location;
    receive at least one non-spatial attribute from the user;
    select a bitmap corresponding to at least one non-spatial attribute from a plurality of bitmaps, each of the plurality of bitmaps being associated with one or more non-spatial attributes; and
    search at least one quad, within a distance of the spatial origin, having at least one point to which at least one non-spatial attribute applies as reflected in the bitmap.

14. The recordable medium defined in claim 13 wherein the least one non-spatial attribute comprises an attribute pair.

15. The recordable medium defined in claim 13 wherein the spatial origin comprises an address.

16. The recordable medium defined in claim 13 wherein the instructions, when executed by a processing device, further cause the processing device to:
    receive three or more non-spatial attributes from the user;
    determine which sets of attribute pairs to use to retrieve intermediate bitmaps;
    retrieve the intermediate bitmaps;
    combine the intermediate bitmaps into a combined bitmap; and
    search at least one quad, within a distance from the spatial origin, having at least one point to which the attributes apply as reflected in the combined bitmap.

17. The recordable medium defined in claim 13 wherein the instructions, when executed by a processing device, further cause the processing device to:
    return a distance ordered list of points to which at least one non-spatial attribute applies.

18. The recordable medium defined in claim 13 wherein the at least one non-spatial attribute comprises at least three attributes and wherein the instructions, when executed by a processing device, further cause the processing device to:
    form a plurality of key word pairs;
    determine which of the plurality key word pairs is a lowest frequency key word pair; and
    scan a bitmap corresponding to the lowest frequency key word pair.

19. A method of indexing to facilitate proximity searching, the method comprising:
    spatial keying a relevant population of points in an area;
    generating a set of non-spatial attributes; and
    generating a plurality of bitmaps to facilitate proximity searching, each of the plurality of bitmaps associating each non-spatial attribute with a subset of spatial keys corresponding to a subset of points to which said each non-spatial attribute applies.

20. The method of claim 19 wherein associating each non-spatial attribute comprises:

dividing the area into a plurality of regions; and generating a bitmap indicating which regions contain a point to which said each non-spatial attribute applies.

21. The method of claim 20 wherein generating the bitmap comprises:

creating a bit string with each bit corresponding to a distinct region; and setting one bit in the bit string if a region corresponding to the one bit contains a point to which the non-spatial attribute applies.

22. The method of claim 21 further comprising: compressing the bitmap storage.

23. The method of claim 19 further comprising:

maintaining a count of a frequency of points to which a non-spatial attribute applies.

24. The method of claim 19 wherein the spatial keys are quadkeys.

25. A system comprising:

a textual key generator to generate a textual key corresponding to each point of a relevant population of points in a database;

an attribute identifier to identify one or more non-spatial attributes corresponding to individual points of the relevant population of points; and a bitmap generator to generate a bitmap for the one or more non-spatial attributes identifying a subset of regions within an area containing a point corresponding to the one or more non-spatial attributes, the bitmap facilitating proximity searching.

26. The system of claim 25 further comprising:

a database storing a set of non-spatial attributes and bitmaps for the set of attributes.

27. The system of claim 25 further comprising a compression engine coupled to compress bitmap, generated by the bitmap generator.

28. A method comprising:

receiving a first non-spatial attribute and a spatial origin from a user, the spatial origin identifying a geographic location;

selecting a bitmap for the non-spatial attribute from a plurality of bitmaps, each of the plurality of bitmaps being associated with a particular non-spatial attribute; and identifying from the bitmap a subset of regions containing at least one point to which the non-spatial attribute applies.

29. The method of claim 28 further comprising:

searching a subset of the subset of regions for points to which the non-spatial attribute applies; and returning to the user a list of points distance ordered from the spatial origin.

30. An apparatus comprising:

means for receiving a first non-spatial attribute and a spatial origin from a user, the spatial origin identifying a geographic location;

means for selecting a bitmap for the attribute from a plurality of bitmaps, each of the plurality of bitmaps being associated with a particular non-spatial attribute; and means identifying from the bitmap a subset of regions containing at least one point to which the non-spatial attribute applies.

31. The apparatus of claim 30 further comprising:

means searching a subset of the subset of regions for points to which the non-spatial attribute applies; and means returning to the user a list of points distance ordered from the spatial origin.

32. An apparatus comprising:

a query processor to receive a first non-spatial attribute and a spatial origin from a user, the spatial origin identifying a geographic location; and a database to store a plurality of bitmaps associated with a particular non-spatial attribute, the query processor to select a bitmap for the first non-spatial attribute from the plurality of bitmaps and to identify from the bitmap a subset of regions containing at least one point to which the first non-spatial attribute applies.

* * * * *

UNITED STATES PATENT AND TRADEMARK OFFICE
CERTIFICATE OF CORRECTION

PATENT NO. : 6,282,540 B1
DATED : August 28, 2001
INVENTOR(S) : Goldensher et al.

Page 1 of 1

It is certified that error appears in the above-identified patent and that said Letters Patent is hereby corrected as shown below:

<u>Column 10,</u>
Line 6, delete "Q1012221990203200" and replace with -- Q1012221220203200 --.

Signed and Sealed this

Twenty-sixth Day of February, 2002

Attest:

*Attesting Officer*

JAMES E. ROGAN
*Director of the United States Patent and Trademark Office*